(12) United States Patent
Glushko et al.

(10) Patent No.: US 6,992,965 B1
(45) Date of Patent: Jan. 31, 2006

(54) READING METHOD AND APPARATUS FOR A THREE-DIMENSIONAL INFORMATION CARRIER

(75) Inventors: Boris Glushko, Ashdod (IL); Vladimir Krupkin, Rishon Le-Zion (IL)

(73) Assignee: D Data Inc., New York, NY (US)

( * ) Notice: Subject to any disclaimer, the term of this patent is extended or adjusted under 35 U.S.C. 154(b) by 0 days.

(21) Appl. No.: 09/297,030

(22) PCT Filed: Aug. 26, 1998

(86) PCT No.: PCT/IL98/00410

§ 371 (c)(1),
(2), (4) Date: May 10, 2002

(87) PCT Pub. No.: WO99/10881

PCT Pub. Date: Mar. 4, 1999

Related U.S. Application Data

(60) Provisional application No. 60/064,298, filed on Nov. 5, 1997.

(30) Foreign Application Priority Data

Aug. 29, 1997 (IL) ..................................... 121620

(51) Int. Cl.
*G11B 7/00* (2006.01)

(52) U.S. Cl. ........................................ 369/103; 369/94

(58) Field of Classification Search ............. 369/275.3, 369/94, 103
See application file for complete search history.

(56) References Cited

U.S. PATENT DOCUMENTS

| | | | |
|---|---|---|---|
| 4,090,031 A | 5/1978 | Russell | |
| 5,268,862 A | 12/1993 | Rentzepis | |
| 6,009,065 A * | 12/1999 | Glushko et al. | ............... 369/94 |
| 6,291,132 B1 * | 9/2001 | Glushko et al. | ............... 369/94 |
| 6,324,148 B1 * | 11/2001 | Kaneko et al. | ............... 369/94 |
| 6,498,775 B1 * | 12/2002 | Fan et al. | ..................... 369/94 |

OTHER PUBLICATIONS

International Search Report dated Nov. 13, 1998.

* cited by examiner

*Primary Examiner*—Nabil Hindi
(74) *Attorney, Agent, or Firm*—Winston & Strawn LLP

(57) ABSTRACT

A method and apparatus for reading in a three-dimensional information carrier are presented. The three-dimensional information carrier is formed with a plurality of spaced-apart data regions, each surrounded by surrounding-regions. The data regions are made of a material capable of generating an output excited radiation, when interacting with a predetermined incident exciting radiation, while the surrounding regions are substantially optically transparent. The apparatus comprises an illumination unit, a light directing unit and a detector unit. The illumination unit produces a scanning beam of the incident radiation. The light directing unit projects the incident radiation onto a scan region located in an addressed plane inside the carrier and collects the output radiation. The light directing unit is capable of picking up a predetermined portion of the collected output radiation, so as to provide spatial separation of the output radiation components produced by the data regions located in the addressed plane and the output radiation components produced by the data regions located at any other location inside the carrier.

6 Claims, 10 Drawing Sheets

READING METHOD AND APPARATUS FOR A THREE-DIMENSIONAL INFORMATION CARRIER

This application claims the benefit of 60/064,298 filed Nov. 05, 1997.

FIELD OF THE INVENTION

The present invention is in the field of scanning techniques and relates to a method and an apparatus for reading/recording data in a three-dimensional information carrier.

BACKGROUND OF THE INVENTION

In most of the known information carriers, such as magnetic and optical disks, tapes, cards, etc., the stored information is distributed within a surface of the carrier. The capacity of a device of this class (i.e. two-dimensional memory device) is limited by the surface area and is inverse proportional to the second order of reading radiation wavelength.

There is increasing demand for cheap and reliable large capacity carriers of digital information for computers, video systems, multimedia etc., and for high-density data storage in optical media, particularly for CD-ROM data and documents and image/movie storage in CD-sized disks. Such a carrier should have a storage capacity in excess of $10^{10}$ bytes, fast access time, high transfer rate and long term stability. Optical methods of recording and reading out information have advantages over magnetic methods due to less restricted requirements of the components and environment, and ability for parallel recording of information which is advantageous for mass production of such carriers.

There are two ways of increasing the storage capacity of an optical information carrier. One approach is based on the fact that the shorter the wavelength of recording radiation, the smaller the size of the illuminated spot. Hence, by decreasing the wavelength $\lambda$ of the recording radiation, the density of the stored data can be increased. The storage capacity of an optical disc is diffraction-limited by a value of N bits, wherein N=Disc-area/$\lambda^2$, because only one binary value is stored in a diffraction-limited pixel. Quadrupled capacity can be gained using "super resolution" at fractions of wavelengths. High density of information is received when 3–5 bits are stored in a single data region, as a small variation of the length of the data region around the diffraction limit. This method requires precision optical, mechanical and electronic components, as well as high quality media, and therefore its capacity is limited by cost effectiveness.

Another approach of increasing the storage capacity of digital data carrier is based on making stacks of two disks. This approach suffers from the following drawbacks:

(1) data regions are light reflective, resulting in undesirable multiple reflection when reading out the stored information;
(2) power losses at each information disk during the propagation of reading and reflected beams to and from the internal disks, respectively;
(3) interference of beams reflected from different disks;
(4) diffraction of beams passing through the disk;
(5) beam distortions due to the optical aberrations, which appear when changing the optical path of the reading beam within the carrier to read different information planes (i.e. different disks); and
(6) high quality optical adhesives required for assembling the stack of disks, having no aberrations, bubbles, separations, inclusions, as well as no mechanical, thermal and chemical impact on the discs.

The information capacity of a stacked information carrier is limited in practice to $10^{10}$ bytes. One example of such an information carrier is the known digital versatile disk (DVD) in the form of a stack composed of two information disks. The disks are attached together by back-sides to double the capacity of the carrier.

Yet another approach consists of making a three-dimensional distribution of data regions within an information carrier, i.e. a three-dimensional optical memory device. The capacity of a three-dimensional memory device is proportional to the third order of reading radiation wavelength. The volume distribution of stored information significantly increases the storage capacity, as compared to that of the two-dimensional device. For example, the total thickness of a three-dimensional optical memory device can be about 1 mm and can consist of information layers having thickness of 0.01 mm. Thus, the storage capacity of this device is 100 times greater than the capacity of a single layer.

It is understood that the more information layers, the greater storage capacity of the memory device. However, the maximum number of information layers depends on a suitable reading technique to be used for reading out the stored information. On the other hand, the reading techniques are based on the main principles of the construction of the optical memory device.

A three-dimensional information carrier and a reading device therefor are disclosed, for example, in. U.S. Pat. No. 4,090,031. The information carrier comprises a substrate and a plurality of data layers provided on one side of the substrate. Each of the layers comprises data tracks formed of lines of data spots. The data spots are formed of either binary coded digital information or frequency or pulse length modulated analog information, which is photographically recorded. According to one approach disclosed in the above patent, the data spots are light reflective, being formed of light reflecting metal material having a reflecting index different from that of the layers. Selection of one data track for reading is accomplished by changing the focus of a reading light beam from one data layer to another. The main drawback of this approach is unavoidable multiple reflection and diffraction produced by different layers, resulting in the undesirable crosstalk affecting the signal-to-noise ratio. Practically, for that reason, such a "reflective" three-dimensional information carrier cannot be formed with more than two-three information layers. In other words, information recorded in a "reflective" information carrier is too limited. By an alternative approach, making the data spots of different photoluminescent materials having different optical properties has been proposed. In this case, the illumination means includes a suitable source of "white" light of many frequencies to illuminate different layers by reading beams of different wavelengths. The detection means includes different colored filters accommodated in front of numerous detectors, each associated with a corresponding one of the data layers. It is evident that this technique significantly complicates the manufacture of both the information carrier and the reading device used therewith.

Another three-dimensional information carrier is disclosed in U.S. Pat. No. 5,268,862, wherein a fluorescent material having special properties is utilized as an active, data-containing material. More specifically, the active material contains photocromic molecules having two isomeric forms. The first isomeric form "A" is not fluorescent, it has absorption bands for ultraviolet radiation, and is transferred to the second form "B" under two visible photons absorption. The form "B" absorbs the two photons of reading radiation and fluoresces in the infrared range. A two-photon absorption process is used for writing information into the medium. Two focused beams are crossed at the region having dimensions of $\lambda^3$, each beam being formed by a picosecond or femtosecond pulse of light to provide the intensity required for both writing and reading processes. This means that two pulses should overlap in time domain. Accordingly, this approach has also a series of drawbacks, which will hardly permit it to be practically realized. First, the two-photon approach requires extremely high intensity laser pulses, I~$10^{12}$–$10^{13}$ W/cm$^2$, which in turn requires the femtosecond pulsewidth Ti:Sapphire lasers. Second, the μm-sized intersection of two focused laser beams required for reading out-the stored information would be very difficult or even impossible for practical realization. Third, the reliable, stable photochrome material which may withstand multiple writing/erasing/reading cycles at a room temperature and possess the optical properties compatible with the existed miniature (diode) laser sources does not yet exist. Another problem is a long time period required for writing the information into the disc, which is about $10^5$ sec, if optimistic information writing rate is $10^6$ bits/sec. This makes the solution proposed in the patent to be very expensive even for mass production.

SUMMARY OF THE INVENTION

There is accordingly a need in the art to significantly improve the conventional reading/recording techniques by a novel method and apparatus capable of reading/recording in a three-dimensional information carrier.

The main object of the present invention is to provide such a method and an apparatus that enables crosstalk between an addressed information layer and all other information layers to be significantly reduced, thereby allowing the number of information layers to be significantly increased.

There is provided according to one aspect of the present invention, a scanning apparatus for reading information in a three-dimensional information carrier formed with a plurality of spaced-apart data regions, each surrounded by surrounding regions, wherein the data regions are made of a material capable of generating an output, excited radiation, when interacting with a predetermined incident, exciting radiation, and the surrounding regions are substantially optically transparent, the apparatus comprising:

(a) an illumination unit producing a scanning beam of the incident radiation;

(b) a light directing unit for projecting said scanning beam on a scan region located in an addressed plane inside the carrier and collecting the produced output radiation, the light directing unit being capable of picking up a predetermined portion of the collected output radiation so as to provide spatial separation of the output radiation components produced by the data regions located in the addressed plane and the output radiation components produced by the data regions located at any other location inside the carrier;

(c) a detector unit having a receiving surface and capable of detecting the output radiation and generating data representative thereof.

The main idea of the present invention is based on the following. The scanning beam is projected onto the scan region located in the addressed layer (e.g. information layer). The scanning beam during the passage through the carrier interacts with the data regions located in and out of the addressed plane. Consequently, the output, excited radiation coming from the carrier contains output radiation components produced by the data regions located in the addressed plane, so-called. "signal radiation", and output radiation components produced by the data regions located out of the addressed plane, so-called "noise radiation". Additionally, radiation coming from the carrier may include components of the incident radiation reflected from specific locations inside the carrier, so-called "noise reflection". The "signal radiation" should be separated from the entire radiation coming from the carrier and delivered to the detector unit. This is possible due to the different natures of incident and excited radiation.

The incident radiation is produced by a source of directed radiation. All the incident radiation is emitted within a certain predetermined solid angle. The excited radiation is undirected; it propagates in all directions from the excited centers, i.e. the data region. The light directing unit picks up and allows the detection of a portion of the collected output radiation propagating with a solid angle spatially separated from the solid angle of propagation of the incident radiation, and prevents a portion of the collected output radiation propagating within the same solid angle of propagation of the incident radiation from being detected. This is implemented here by utilizing a beam splitter accommodated in the optical path of the incident and output radiation. The beam splitter defines transmitting and non-transmitting (blocking) zones with respect to the incident, and transmitting and reflective zones with respect to the output radiation at predetermined locations.

According to one embodiment of the invention, the beam splitter comprises a central zone transmitting both the incident and output radiation, and a periphery zone surrounding the central zone, which is blocking and reflective with respect to the incident and output radiation, respectively. Thus, the incident radiation propagates within a paraxial area of the optical axis defined by the light directing unit. Only those components of the output radiation that propagate inclined to the optical axis (i.e. out of the paraxial area) are picked up and reflected towards the detector unit.

According to another embodiment of the invention, a beam splitter blocks a central portion of the incident radiation propagating substantially along the optical axis, and reflects solely that component of the output radiation which propagates within the paraxial area of the optical axis.

Thus, the optical paths of incident and excited radiation are spatially separated by means of the beam splitter and the only output radiation components propagating in a certain direction are reflected onto the detector unit by the beam splitter. The light directing unit comprises suitable optics that projects the scanning beam onto the scan region located in the addressed plane. Such optics typically provides different solid angles of propagation of output radiation components generated at different planes. By appropriately orienting the detector unit, only those components that impinge onto the reflective zone of the beam splitter at a desired angle, reach the detector unit.

The detector unit comprises a sensor means and a filtering means. The filtering means preferably comprises an optical filter, which may include a spatial filter and/or a spectral filter that allows the passage of the output radiation spectrum onto the sensor means and prevents the incident radiation spectrum from reaching the sensor means. The receiving surface is defined either by the optical filter, or, in the absence of the latter, by the sensor means.

The scan region may be sufficiently small to cover at least a portion of only one data region. Alternatively, the scan region may cover a plurality of data regions. In this case, the optical filter is in the form of a diffraction-limited aperture hole, whose diameter is defined by the dimensions of an image of one data region from the illuminated scan region, as obtained at the receiving surface.

The detector unit may also comprise a band-pass filter coupled to the sensor means so as to be responsive to the data representative of the detected output radiation and to separate therefrom a desired frequency range. This desired frequency range is indicative of an information signal coming from the addressed plane, this information signal having at least one parameter different from that of information signals coming from other non-addressed planes.

According to another aspect of the present invention, there is provided a method for reading information in a three-dimensional information carrier formed with a plurality of spaced-apart data regions, each surrounded by surrounding regions, wherein the data regions are made of a material capable of generating an output excited radiation, when interacting with a predetermined incident exciting radiation, and the surrounding regions are substantially optically transparent, the method comprising:

1) producing a scanning beam of said incident radiation;
2) projecting said scanning beam onto a scan region located in an addressed plane inside the carrier and collecting the produced output radiation;
3) picking up a predetermined portion of the collected-output radiation so as to provide spatial separation of the output radiation components produced by the data regions located in the scan region and the output radiation components produced by the data regions located at any other location inside the carrier;
4) directing the output radiation components produced by the data regions located in the scan region to a detector unit;
5) detecting the output radiation and generating data representative thereof.

More specifically, the present invention is used with a multilayer optical disk for reading information stored therein and is therefore described below with respect to this application.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1A:
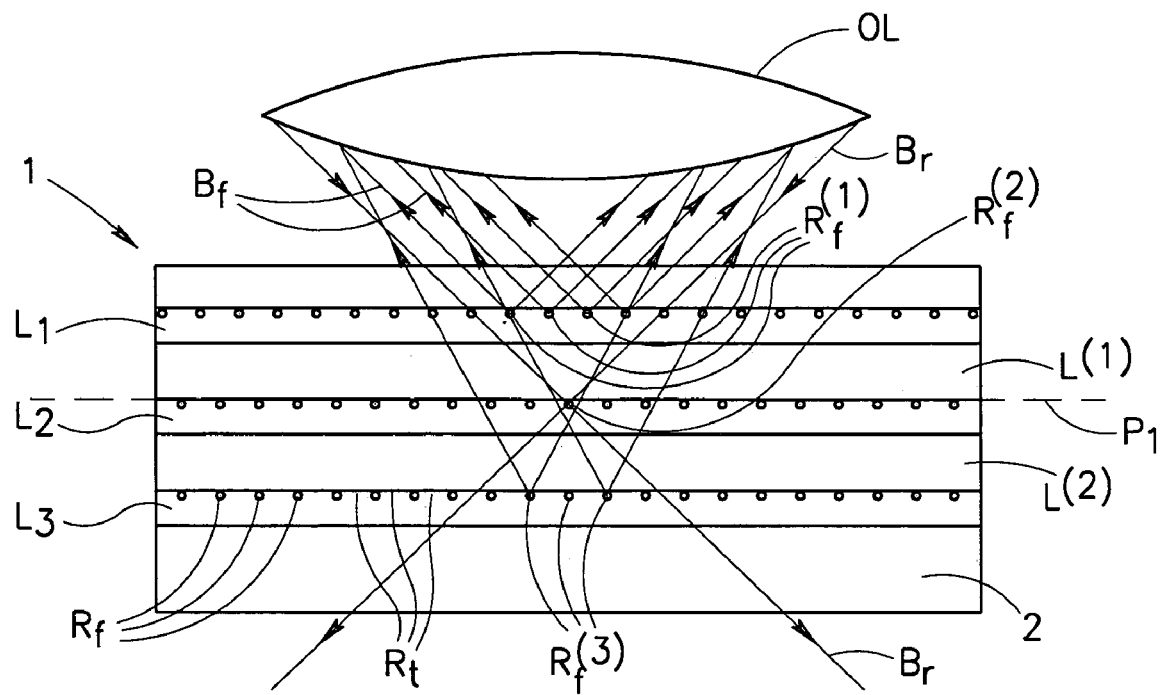
FIGS. 1a and 1b schematically-illustrate the main principles of reading information in a three-dimensional fluorescent information carrier.

In order to more clearly illustrate the unique feature of the present invention, it would be reasonable to consider a three-dimensional optical memory device that utilizes fluorescent data regions, i.e. regions excitable in response to predetermined incident radiation. FIG. 1a schematically illustrates a three-dimensional optical disk, generally designated 1, that comprises several information layers, for example, three layers $L_1$, $L_2$ and $L_3$, formed on a substrate 2. Thickness d of each information layer is approximately 0.3–20 $\mu$m. The adjacent information layers are spaced by intermediate layers $L^{(1)}$ and $L^{(2)}$, respectively, made of substantially optically transparent material. Thickness L of each intermediate layer is approximately 5–500 $\mu$m.

Figure 1B:
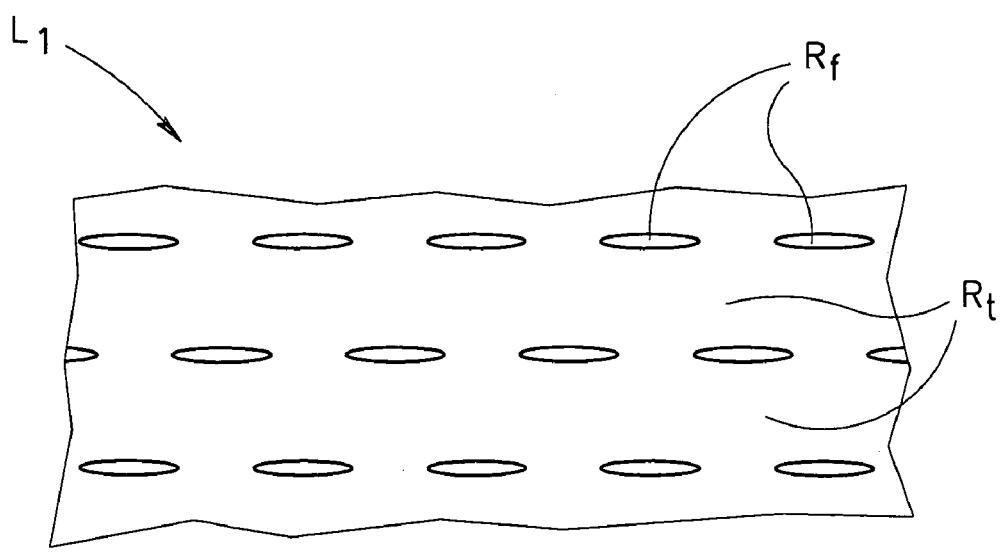

As better shown in FIG. 1b, information stored in the information layer, for example layer $L_1$, is in the form of a pattern having a plurality of spaced-apart data regions, generally at $R_f$, containing fluorescent material, which are spaced by surrounding, substantially optically transparent regions $R_t$. Such a memory device and methods of its manufacturing are disclosed in U.S. patent application Ser. No. 08/956,052 assigned to the assignee of the present application.

If the disk 1 is illuminated by predetermined incident radiation, the fluorescent regions $R_f$ interacting with the incident radiation generates (excite) output fluorescent radiation. Turning back to FIG. 1a, a scanning beam of the suitable incident radiation, generally at $B_r$, is directed through an objective lens OL onto an addressed layer, for example layer $L_2$, located in a focal plane $P_1$ of the lens. The optical path of the incident (reading) radiation $B_r$ inside the disk 1 includes fluorescent regions $R_f^{(1)}$, $R_f^{(2)}$ and $R_f^{(3)}$ located above, in and below the addressed layer, respectively. All these regions produce output fluorescent radiation, generally at $B_r$. Only that fluorescent radiation component which is produced by the data region $R_f^{(2)}$ located in the addressed layer represents a signal to be detected. (i.e. "signal fluorescence"), while the fluorescent radiation components produced by the non-addressed data regions $R_f^{(1)}$ and $R_f^{(3)}$ represent noise to be filtered out (i.e. "noise fluorescence"). Additionally, although not specifically shown, certain reflected radiation may appear, because of refraction index differences, for example, caused by an adhesive material used for attaching the layers to each other. This reflected radiation also represents noise to be filtered out (i.e. "noise reflection").

Figure 2A:
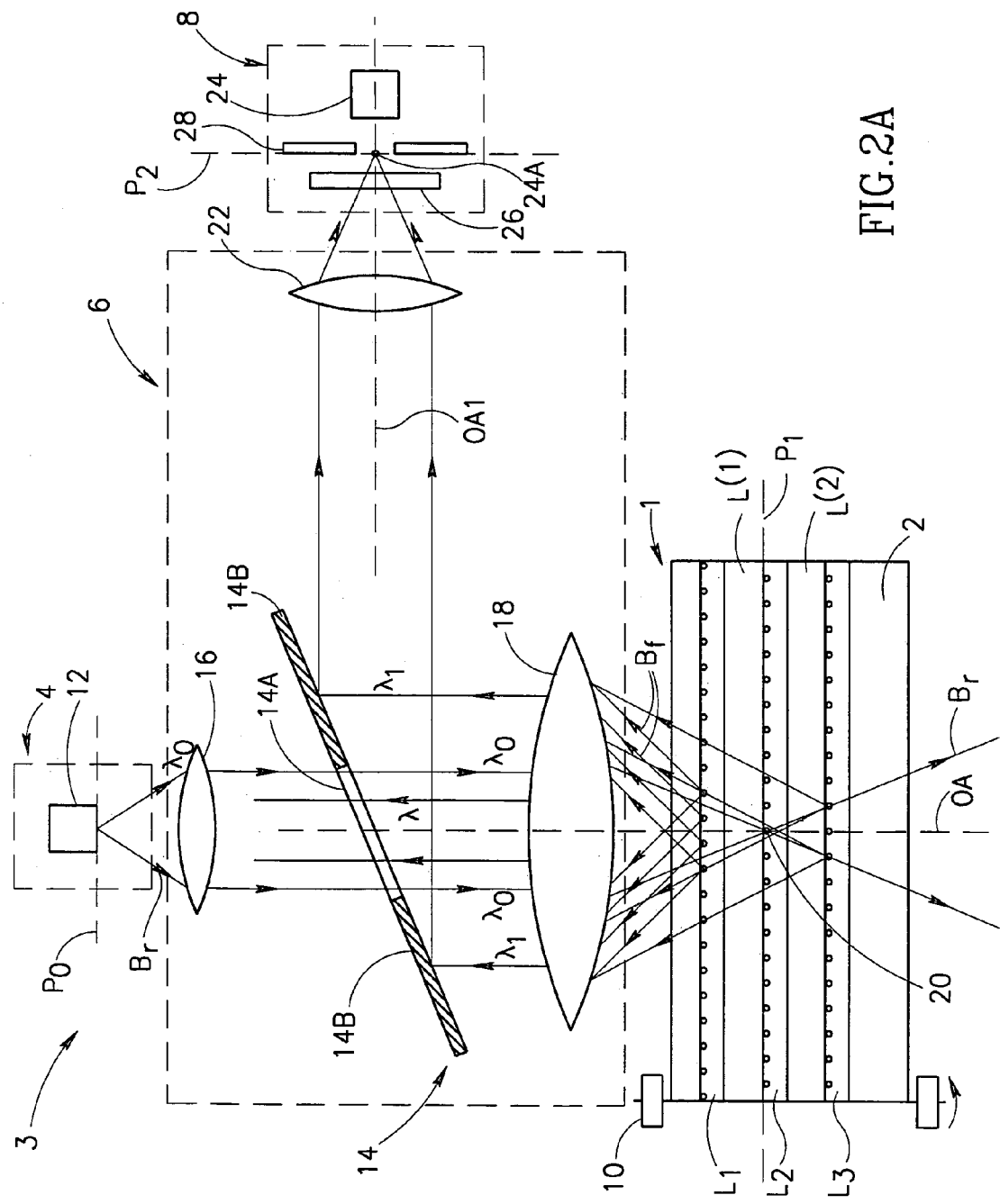
FIG. 2a is a block diagram illustrating the main components of a reading apparatus constructed according to one embodiment of the invention.

Referring to FIG. 2a, there is illustrated a reading apparatus, generally designated 3, constructed according to one embodiment of the invention, suitable for reading out information stored in the disk 1. The apparatus 3 comprises an illumination unit generally at 4, a light directing optics 6 and a detector unit 8. A suitable drive means, generally at 10, is typically provided for driving the rotation of the disk 1 about its axis, and for driving a reciprocating movement of the disk 1 with respect to the reading apparatus 3 so as to effect scanning of the addressed layer.

The illumination unit 4 includes a light source 12 in the form of a laser diode that generates a reading beam $B_r$ having the wavelength $\lambda_0$. The interaction between the reading beam $B_r$ and the fluorescent data regions $R_f$ produces output fluorescent radiation $B_f$ having wavelength $\lambda_1$ different from that of the reading beam.

The light directing optics 6 comprises a beam splitter 14, converging lenses 16 and 18 accommodated at opposite sides of the beam splitter 14 such that the light source 12 and the addressed layer $L_2$ are positioned in the focal planes $P_0$ and $P_1$ of the lenses 16 and 18, respectively. Thus, the lens 16 directs the reading radiation $B_r$ in the form of a parallel beam onto the beam splitter 14, while the lens 18 focuses the reading beam onto a spot 20 (constituting a scan region) in the focal plane $P_1$ which is maintained to coincide with the addressed layer $L_2$ (using a suitable auto-focusing technique). A similar imaging lens 22 is accommodated in the optical path of the fluorescent radiation $B_f$ propagating towards the detector unit 8.

The detector unit 8 comprises a suitable sensor 24, a spectral filter 26 and an aperture 28 (constituting an optical filter). The filter 26 may be of any known kind, operating so as to allow the propagation therethrough of the known spectrum of the fluorescent radiation, and to prevent any other radiation (reading) from being detected by the sensor 24. The latter operates in a conventional manner for providing electrical output representative of the radiation components received. The aperture 28 is typically a radiation blocking plate 29a formed with a radiation transmitting hole 29b, the particulars of which will be described further below with reference to FIGS. 6 and 7. The aperture 28 is located in a focal plane $P_2$ of the imaging lens 22 and defines a sensing surface 24a.

Figures 2B, 3:
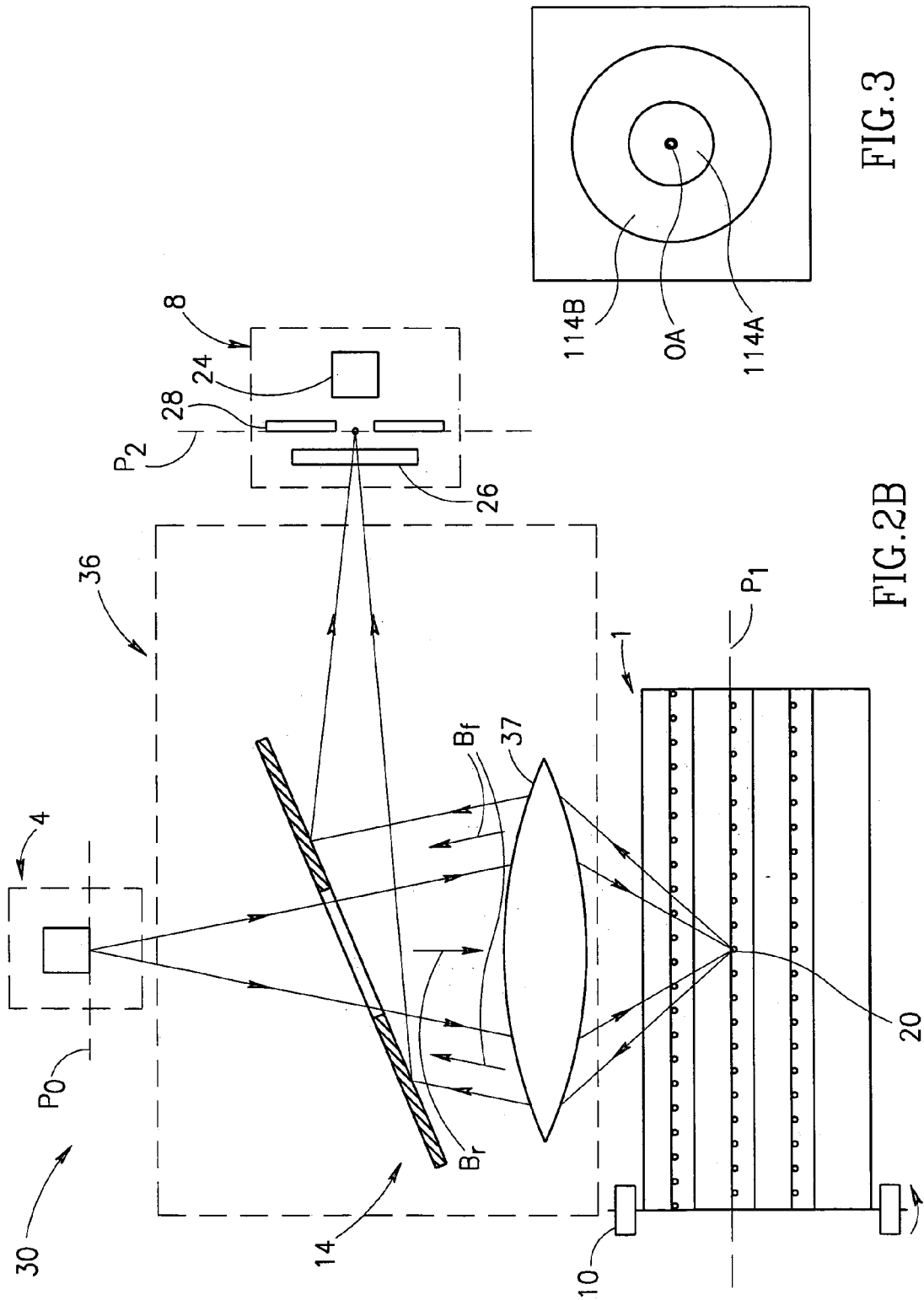
FIG. 2b is a block diagram illustrating the main components of a reading apparatus constructed according to another embodiment of the invention.
FIG. 3 more specifically illustrates the construction of a beam splitter suitable for the apparatus of either FIG. 2a or 2b.

In the above example, the light directing optics 6 comprises lenses 16, 18 and 22, having the light source 12, addressed plane and receiving surface 24a in their focal planes, respectively. FIG. 2b illustrates an alternative example of a reading apparatus 30, which is generally similar to the apparatus 3, but has a somewhat different construction of a light directing optics 36. The same reference numbers are used for identifying those components, which are identical in the devices 3 and 30, to facilitate understanding. Here, the focusing lenses 16, 18 and 20 of the apparatus 3 are replaced by a single collecting lens 37. The lens 37 typically projects the light source 12 located in the plane $P_0$ onto the spot 20 located in the plane $P_1$ and directs beams coming from the spot 20 onto an imaging plane $P_2$. The planes $P_0$, $P_1$ and $P_2$ here, as well as in the example of FIG. 2a, are three conjugated planes.

Referring to FIGS. 2a, 2b and 3, the beam splitter 14 is formed with zones 14a and 14b having different properties with respect to the incident radiation $B_r$ and fluorescent radiation $B_f$. The zones 14a and 14b are located relatively close to and distanced from an optical axis OA defined by the optics 6, respectively. The circular zone 14a is high transitive for all wavelength ranges (i.e. for both the reading and fluorescent radiation $B_r$ and $B_f$). The transmitting zone 14a may be a through-going hole made in the central portion of the beam splitter 14. As for the annular-shaped zone 14b, it blocks the incident radiation by its one side facing the light source 12, and has a reflective opposite side facing the disk 1. In other words, the beam splitter 14 is in the form of annular-shaped mirror. It should be noted that the annular shape is an optional solution, which is preferable in view of considerations of symmetry and effectiveness.

Figure 4A:
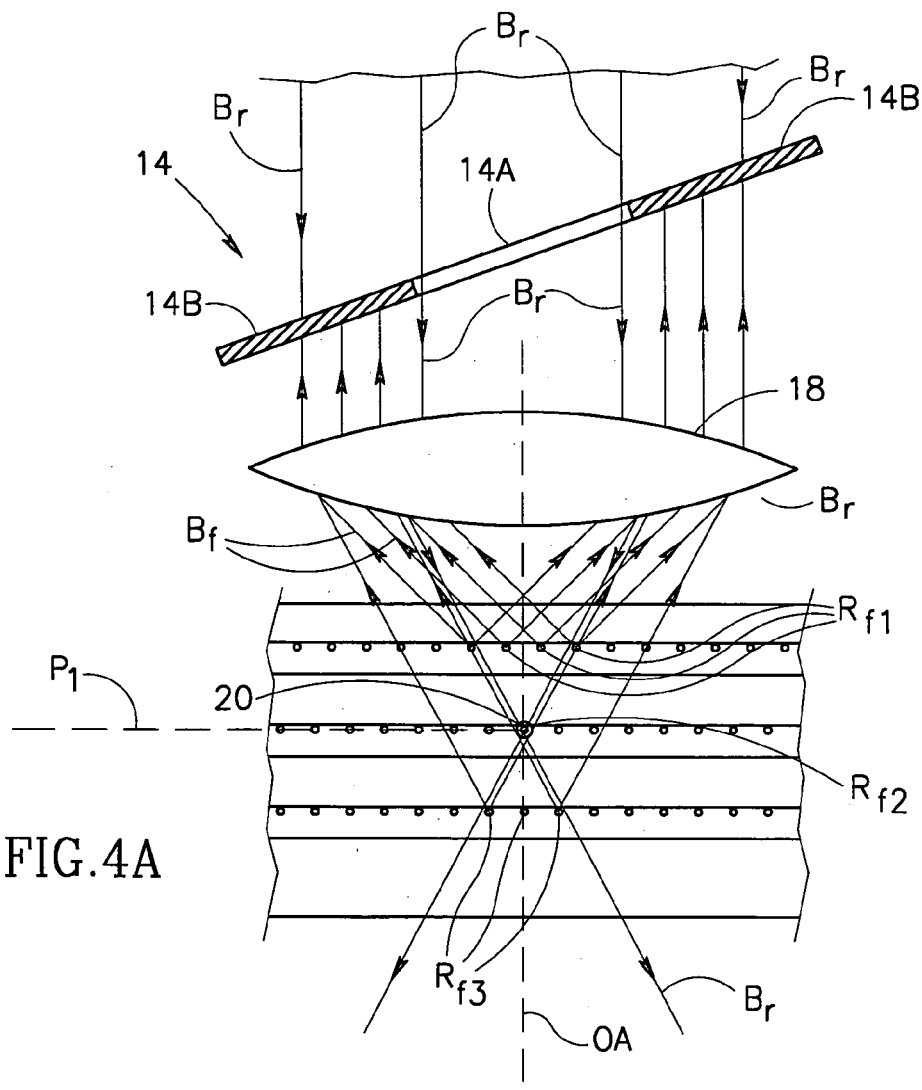
FIGS. 4a and 4b schematically illustrate the main operational principles of the apparatus of either FIG. 2a or FIG. 2b.
Figure 4B:
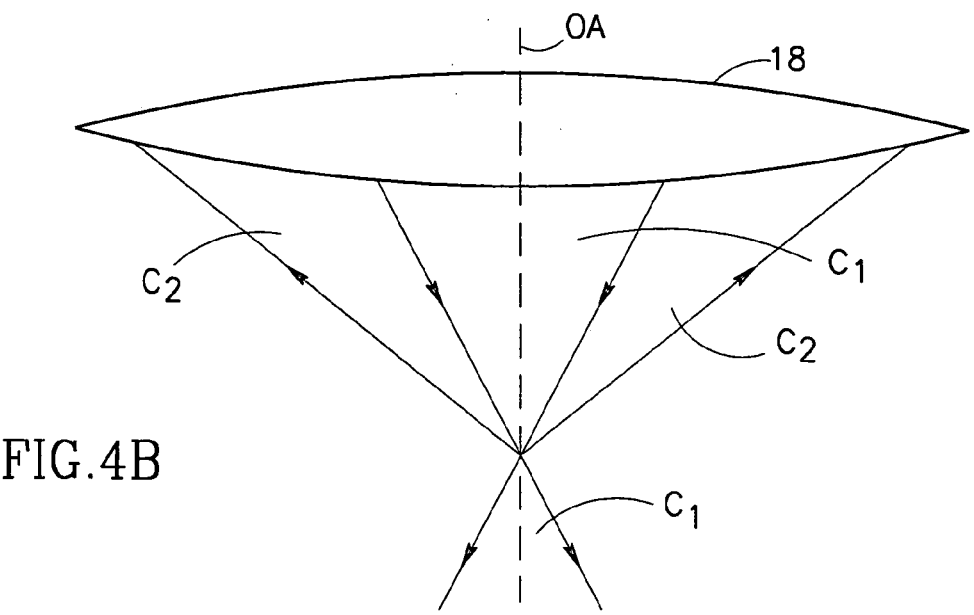

FIGS. 4a and 4b illustrate more specifically the operation of the beam splitter 14 with respect to the incident beam $B_r$ impinging thereon. The beam splitter 14 cuts off a portion of the incident beam $B_r$ propagating in a periphery area relative to the optical axis OA, and allows the passage of a portion of the beam $B_r$ propagating in a paraxial area of the optical axis OA through the transmitting zone 14a. The transmitted portion of the reading beam $B_r$, being projected by the lens 18 (FIG. 2a) onto the spot 20, propagates to the focal plane $P_1$ within a certain solid angle defining an upper-cone $C_1$ and further (towards the bottom of the disk 1) within a similar lower-cone $C_1$. The beam $B_r$ interacts with the fluorescent regions $R_f$ located in the before-focus layer $L_1$, with the in-focus fluorescent region $Rf_2$ and with the fluorescent regions $Rf_3$ located in the after-focus layer $L_3$. These regions generate the fluorescent radiation components, generally at $B_f$, which are collected by the lens 18 and directed onto the beam-splitter 14.

The reading radiation is produced by a directed source of radiation, the laser diode in the present example. All the reading radiation $B_r$ propagates within a certain solid angle and can be confined within the numerical aperture NA up to 0.2–0.4 without intensity losses. The solid angle of propagation (cones $C_1$) of the reading radiation $B_r$ inside the disk 1 (i.e. the surface area of interaction between the reading radiation and the inside of the disk) is defined by the numerical aperture of the reading light propagation. Reflected radiation, if any, would mainly propagate within the same upper-cone $C_1$ and would therefore be transmitted back through the zone 14a.

As for the excited, fluorescent radiation $B_r$ it is undirected, propagating in all directions from its source (i.e. the excited fluorescent region $R_f$). The amount of fluorescent radiation $B_f$ that propagates substantially along the optical axis OA (with the numerical aperture up to 0.2–0.4), i.e. within the upper-cone $C_1$, is small, as compared to the fluorescent radiation propagating inclined to the optical axis OA (with the numerical aperture NA, from 0.2–0.4 up to 0.6–0.7), within a ring-shaped cone segment $C_2$. Hence, by collecting only those components of the fluorescent radiation which propagate within the cone segment $C_2$ inclined to the optical axis OA, the energy losses are acceptable.

Thus the fluorescent radiation $R_f$ impinges onto the mirror 14 and is transmitted through the zone 14a and reflected by the zone 14b. It is understood, although not specifically shown, that only those fluorescent radiation components that are produced at the focal point, i.e. the addressed fluorescent region $Rf_2$, ensue from the lens 18 parallel to its optical axis OA, and therefore impinge onto the reflective zone 14b at a certain angle (45° in the present example of FIG. 2a). As for the other fluorescent radiation components, they are produced at out-of-focus locations, and therefore impinge onto the mirror 14 at angles other than that of the in-focus generated components. Turning back to FIG. 2a, an optical axis $OA_1$ of the imaging lens 22 is perpendicular to the optical axis OA, i.e. is parallel to those fluorescent radiation components that are reflected from the mirror portion 14b at the certain angle (e.g. 45°). Consequently, the fluorescent radiation components impinging onto the imaging lens 22 parallel to its optical axis $OA_1$, would intersect in its focal plane $P_2$, i.e. at the location of the receiving surface 24a.

Figure 5A:
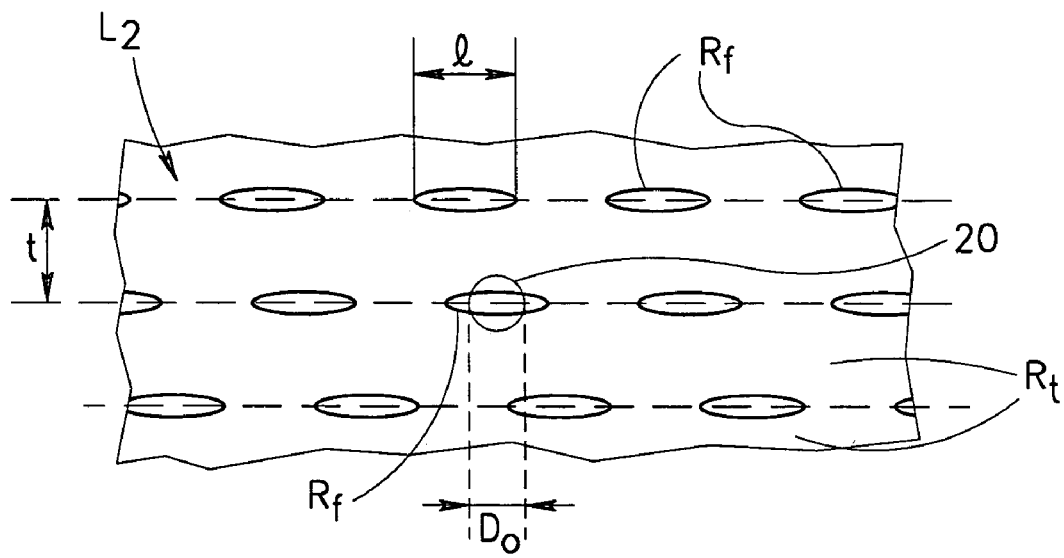
FIGS. 5a and 5b schematically illustrate two different examples of a scan region obtained in the apparatus of either FIG. 2a or FIG. 2b.
Figure 5B:
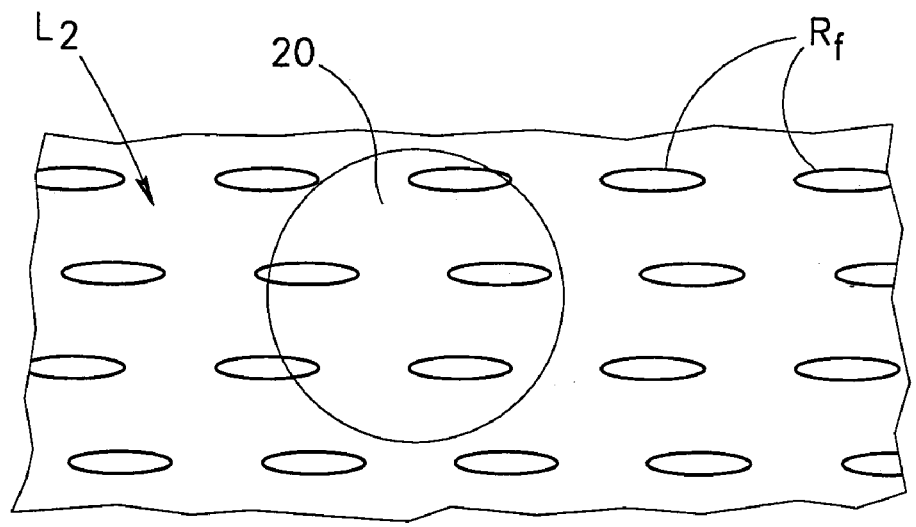

To successfully read out the stored information, the apparatus 3 utilizes a diffraction-limited illumination channel and, if needed, a diffraction-limited receiving channel. FIGS. 5a and 5b illustrate two different examples of diffraction-limited illuminated spots that could be produced in the apparatus 3. As shown in FIG. 5a, the diameter of the illuminated spot 20 is sufficiently small, so as to cover at least a portion of only one fluorescent region $R_f$. In other words, if I is the average length of the fluorescent region, t is a track pitch and $D_0$ is the diameter of the illuminated spot 20, then the following conditions take place: $D_0 \leq 1$; and $D_0 < 2t$. In this case, the aperture 28 placed in the receiving channel may have a relatively large aperture hole 29b (FIG. 2a) relative to the dimensions of the spot 20 and to that of its image obtained at the receiving surface 24a. Theoretically, the provision of such an aperture is optional. In the absence of the aperture 28, the receiving surface 24a is constituted by the sensing surface (not shown) of the sensor 24.

According to the example of FIG. 5b, the light source is non-coherent, even non-monochromatic (e.g. LED, lamp), and therefore the illuminated spot 20 covers several fluorescent regions. In this case, the diameter of the aperture hole 29b is substantially equal to that of the image of one fluorescent region included in the illuminated spot 20, as obtained at the receiving surface 24a (taking into account a certain magnification provided by the optical elements).

Figure 6:
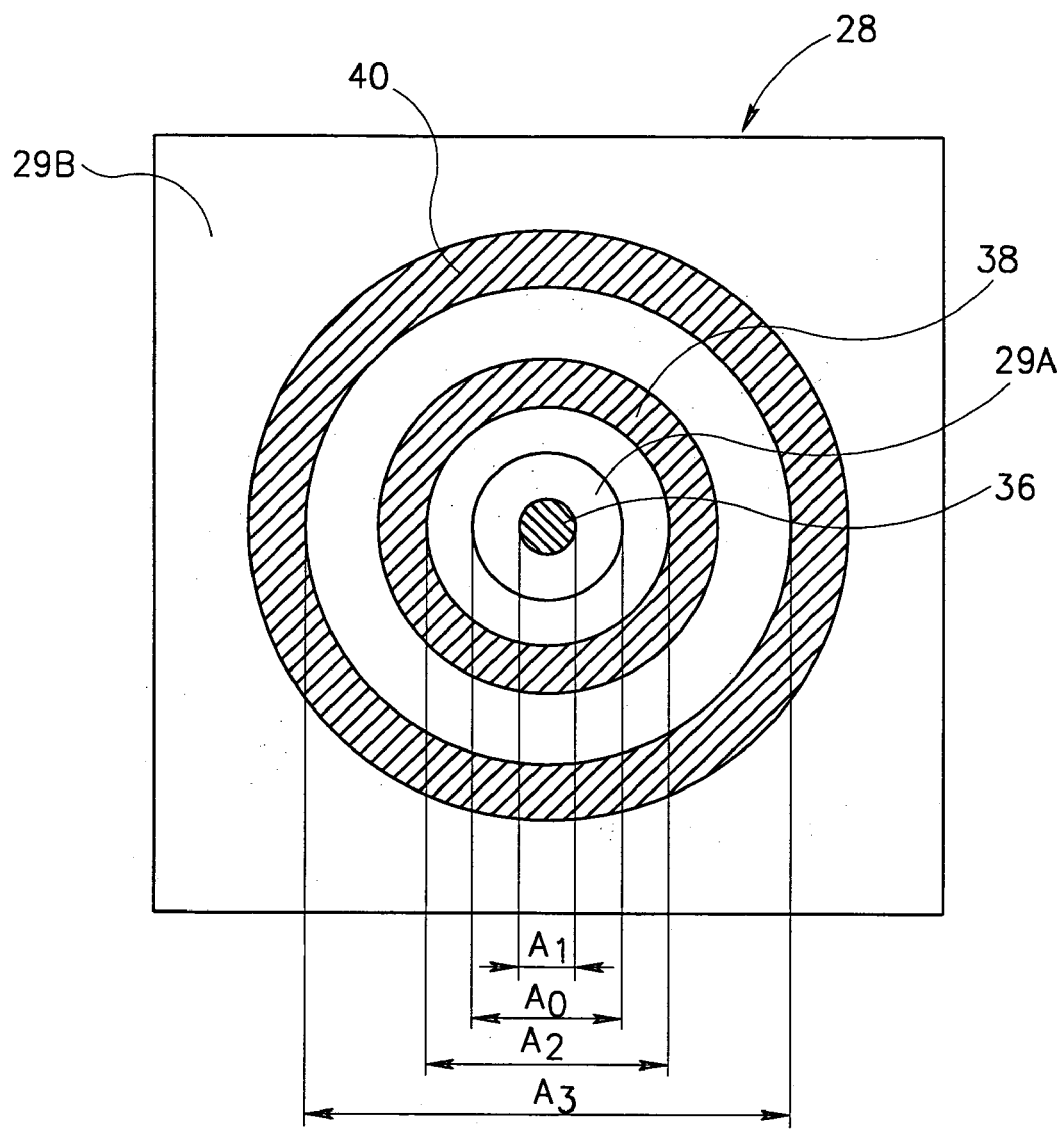
FIG. 6 illustrates more specifically the construction of an aperture suitable for use in the apparatus of either FIG. 2a or FIG. 2b.
Figure 7:
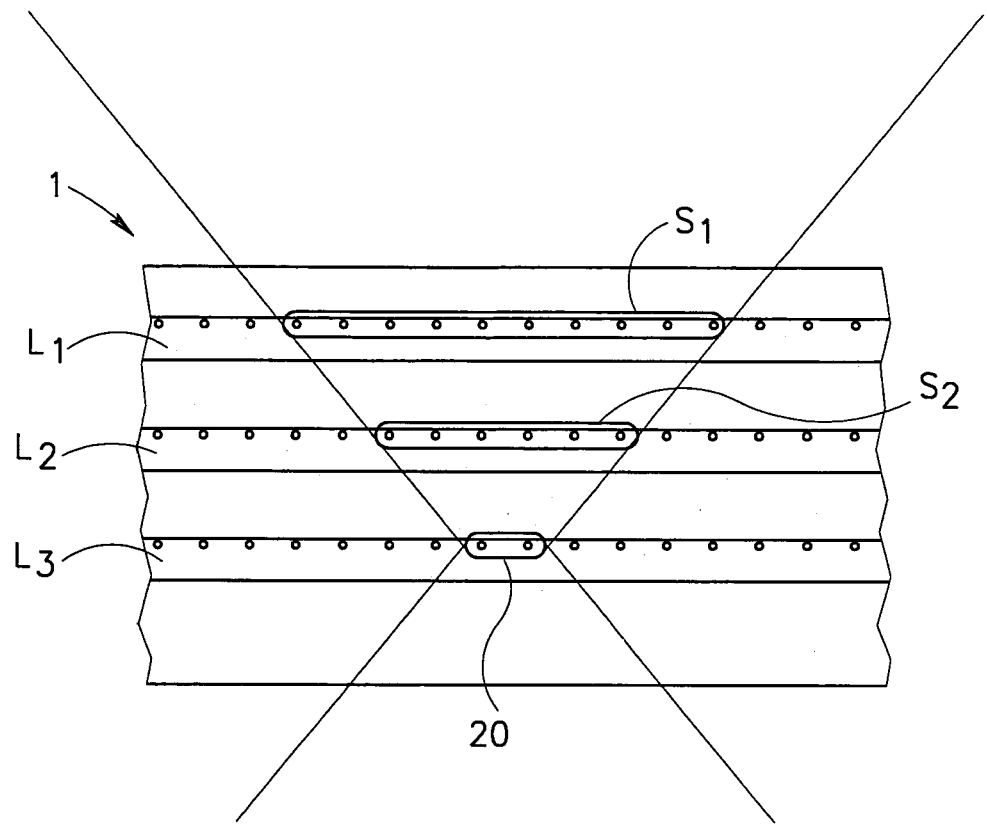
FIG. 7 schematically illustrates the main principles underlying the implementation of the construction of the aperture of FIG. 6.

FIGS. 6 and 7 illustrate the main principles underlying the implementation and operation of the aperture 28. In order to facilitate understanding, the addressed layer is selected to be $L_3$. Thus, the reading radiation $B_r$ illuminates the spot 20 in the addressed layer $L_3$, and spots $S_2$ and $S_1$ in the upper layers $L_2$ and $L_1$, respectively. The aperture hole 29b has a diameter $A_0$ slightly larger than the diameter $A_1$ of an image 36 of one fluorescent region located within the illuminated spot 20 in the addressed layer $L_3$. The diameter $A_0$ of the aperture hole 29b should, however, be less than that of the image of the track pitch (not shown). Rings 38 and 40 having internal diameters $A_2$ and $A_3$, respectively, are images of the illuminated spots $S_2$ and $S_1$ located in the layers $L_2$ and $L_1$, respectively.

In view of the above, the beam splitter 14 plays the following two roles:
1) It prevents the sensor 24 from receiving radiation reflected from the disk 1. Indeed, the beam splitter 14 separates the optical paths of the reading and fluorescent radiation and reflects towards the sensor 24 only the fluorescent radiation;
2) It provides the spatial separation of the "signal fluorescence" and "noise fluorescence" on the conjugate plane $P_2$ (the receiving surface 24a). Indeed, the fluorescent radiation coming from any out-of-focus layer ("noise") is projected onto the plane $P_2$ in the form of a ring having an internal radius larger than that of the aperture hole 29a. On the contrary, the fluorescent radiation coming from the in-focus layer ("signal"), is projected onto the plane $P_2$ in the form of a diffraction-limited spot.

Turning back to FIGS. 6 and 7, the internal diameter of the ring 38 formed by radiation coming from the layer $L_2$ adjacent to the in-focus layer $L_3$ may be represented as follows:

$$A_2 = 2L/(NA)_r(f_2/f_1) \quad (1)$$

wherein $NA_r$ is the numerical aperture of the incident radiation propagation; $f_1$ and $f_2$ are focal length of the objective lens 18 and imaging lens 22, respectively, such that $f_2 > f_1$.

The rings formed by light coming from other out-of-focus layers have diameters of size $A_i = iA_2$, where $i=2,3,\ldots$. Thus, if the aperture hole 29a having the diameter $A_1$ that satisfies the following condition: $\lambda_f < A_0 < A_1$ is placed at the focal plane of the imaging lens 22, it transmits radiation coming from the point at the desired, addressed layer and cuts-off light coming from all out-of-focus layers. This results in the negligible crosstalk between the neighboring layers. The signal-to-noise ratio can be estimated as follows:

$$S/N \approx f_2^2 A_2^4 (NA)_f^2 / f_1^2 A_0^4 (NA)_i^2 \sim 10^4 \quad (2)$$

It is important to note, although being not specifically shown, that owing to the fact that output fluorescent radiation propagates in all directions from its source (i.e. the fluorescent region), the detector unit could be accommodated at the opposite side of the disk, as compared to that of the illumination unit location. Inconvenience caused by such location of the detector unit is the need for separate light collecting optics at the same side as the detector unit.

Figure 8:
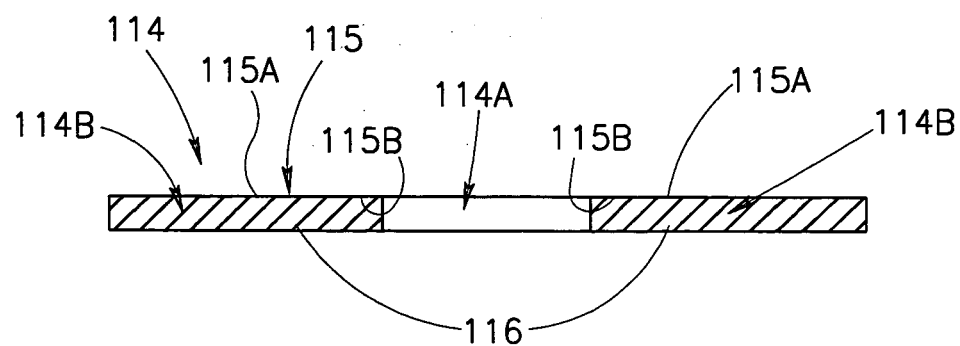
FIG. 8 illustrates another construction of a beam splitter suitable for use in the apparatus of either FIG. 2a or FIG. 2b.

The mirror 14 in the devices 3 and 30 could be replaced by a dichroic-like, selectively reflective beam splitter 114 schematically illustrated in FIG. 8. The beam splitter 114, similar to the beam splitter 14, is formed with a central hole 114a, constituting a transmitting zone, and a surrounding zone 114b. A front side 115 of the zone 114b (with respect to the direction of propagation of the incident radiation) has an absorbing (black) outer surface 115a and reflective (i.e. aluminum) coating on its inner surface 115b. The reflective coating is covered by a material 116, for example a suitable color-glass, that absorbs the spectrum of incident radiation and transmits that of the fluorescent radiation. This construction of the beam splitter 114 eliminates the need for a spectral filter in the detection unit. It should be noted, although not specifically shown, that an appropriately designed holographic plate may replace the lenses 16 and 22 and the beam splitter 14, 114, provided it is capable of carrying out the following functions:
projecting the light source 12 (located in the plane $P_1$) onto the diffraction-limited scan region 20 located in the conjugate plane $P_1$ inside the disk 1;
providing a predetermined solid angle of propagation of the scanning beam;
picking up predetermined components of the output radiation propagating with a certain solid angle spatially separated from the solid angle of propagation of the scanning beam;
projecting the picked up components of the output radiation onto the receiving surface 24a located in the conjugate plane $P_2$.

In the above-described examples, the incident radiation propagates substantially along the optical axis OA (cone $C_1$), while the picked up fluorescent radiation components propagate inclined to the optical axis OA (cone $C_2$).

Figure 9:
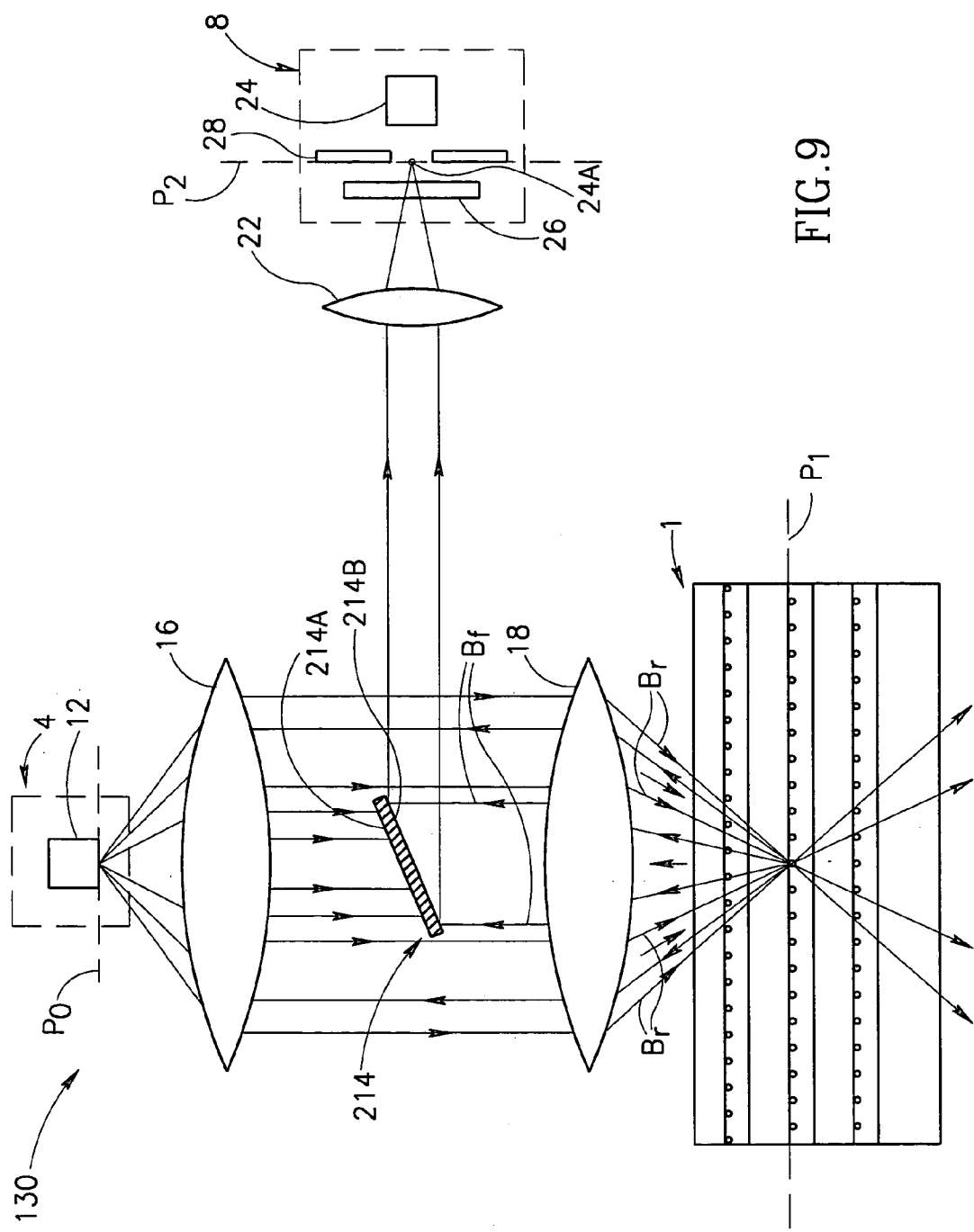
FIG. 9 is a block diagram illustrating a reading apparatus according to yet another embodiment of the invention.

Reference is made to FIG. 9, illustrating a reading apparatus 130 constructed according to yet another embodiment of the invention, utilizing an alternative condition for the numerical apertures of incident and fluorescent radiation propagation. Similarly, the same reference numbers are used for identifying those components, which are identical with the previously described examples. The apparatus 130 comprises a beam splitter 214 in the form of a mirror having radiation blocking and reflective surfaces 214a and 214b, respectively. The mirror 214 is accommodated so as to cut off a central portion of the incident beam $B_r$ defined by the dimensions of the mirror 214, and to transmit a periphery portion of the incident beam $B_r$ around the mirror 214. The output radiation components propagating substantially along the optical axis OA are reflected from the reflective surface of the beam splitter 214. Thus, the output fluorescent radiation propagates within the central cone $C_1$, while the incident radiation propagates within the surrounding cone-segment $C_2$. The beam splitter 214 may be dichroic-like, selectively reflecting as described above with respect to the beam splitter 114 illustrated in FIG. 8.

It is known that differences in refraction indices of different layers is the reason for undesirable multiple Fresnel reflection in the disk 1. As indicated above, the difference in the refraction indices may be introduced by the adhesive material. In other words, it is not always possible to provide a multilayer disk with negligible difference in refractive indices of the layers.

Figure 11:
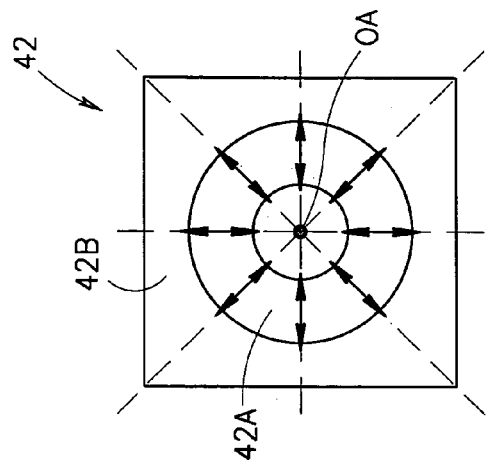
FIG. 11 illustrates more specifically the construction of a polarizer of the apparatus of FIG. 10.
Figure 10:
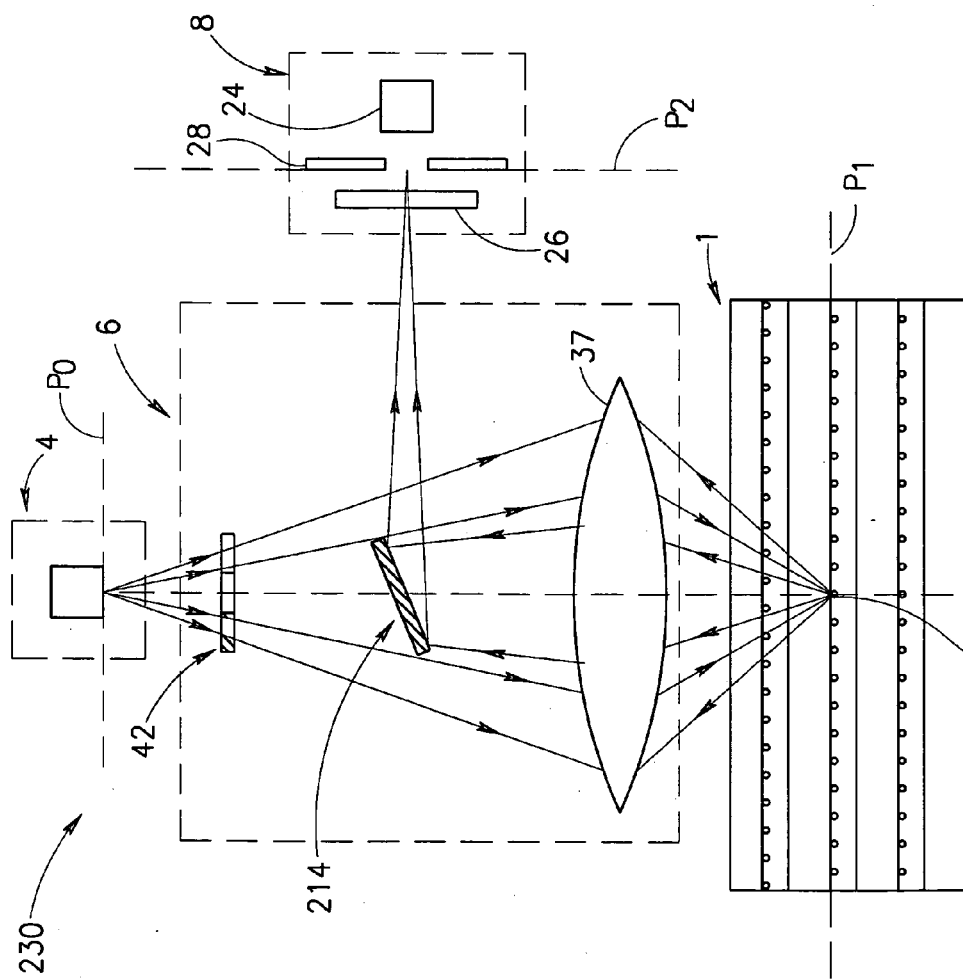
FIG. 10 schematically illustrates a reading apparatus constructed according to yet another embodiment of the present invention.

FIG. 10 illustrates a reading apparatus 230 whose construction enables reading of the stored information in a manner to prevent Fresnel reflections. Here, the light directing optics 6 is constructed partly similar to that of the apparatus 30 described above with reference to FIG. 2b and partly similar to that of the apparatus 130. More specifically, it comprises the lens 37 projecting the light source 12 onto the spot 20 located in the addressed plane and the beam splitter 214. The apparatus 230 distinguishes from the previously described examples in the provision of a radial polarizer 42 accommodated in the optical path of the emitted incident radiation $B_r$. The construction of the polarizer 42 is more specifically illustrated in FIG. 11. The polarizer 42 is in the form of a polarizing ring 42a formed in a radiation blocking plate 42b. The ring 42a has a radially oriented plane of its preferred transmission (polarization) so as to transmit only those components of the beam $B_r$ that have polarization vector lying in a plane containing optical axis OA for any part of the beam. The ring 42a is accommodated such that a rim angle of the conical beam impinging onto the disk 1 is close to Brewster angle, and, therefore, the reflection of such beam is negligible.

It should be noted that the polarizer 42 may be a constructional part of the light source 12, of the beam splitter 214 or of the lens 37 as a window, holographic element or grating.

The above technique of picking up the fluorescent component produced in the addressed plane in the disk 1 (i.e. in the addressed information layer) from all fluorescence coming from the disk 1 can be further improved in view of the following considerations. The incident beam on its way inside the disk interacts with the data regions located in and out of the addressed layer. The data regions are distributed in each information layer in a spaced-apart manner. A process of reading a binary information stored in the addressed information layer is implemented by detecting an information signal coming from successive illuminated spots 20 located in the addressed plane during the rotation of the disk 1. This information signal is in the form of a sequence of fluorescent and non-fluorescent regions $R_f$ and $R_t$ in the addressed layer. The information signal associated with the addressed layer should be separated from all other signals propagating towards the detector unit. The frequency of the information signal is defined by the known distribution of the fluorescent regions $R_f$ in the layer (i.e. the distance between the adjacent fluorescent regions) and by the known speed of rotation of the disk (i.e. the scanning speed). Hence, this information signal can be estimated prior to the reading procedure and, therefore, can be expected in the detecting channel.

The estimation of the expected information signal is based on the following considerations. The amount of the fluorescent radiation, collected by the lens 18 (FIG. 2a) and delivered to a detecting channel (not shown), is defined by the numerical aperture $(NA)_f$ of radiation propagation, as follows:

$$\eta_{collected} \approx ((NA)_f/2)^2$$

$$\eta_{collected} \approx 0.09 \text{ for } (NA)_f = 0.6 \quad (3)$$

The intensity $I_f$ of the fluorescent radiation produced by illuminating the single fluorescent region is determined by the intensity $I_r$ of the incident (reading) laser beam as follows:

$$I_f = q I_r \alpha d \quad (4)$$

wherein q is the fluorescence quantum yield; α is extinction coefficient; d is the thickness of the fluorescent region.

Assuming that a multilayer disc is formed of M layers and the reading laser beam is focused onto an addressed m-th layer ($M \geq m \geq 1$), when the laser beam passes through any out-of-focus layer, its power decreases P time, that is:

$$P = (1 - \alpha dF)(1 - R) \quad (5)$$

wherein F is the information layer filling rate (i.e. the surface area covered by the fluorescent regions with respect to whole surface); R is the effective interface's power reflection coefficient (i.e. Fresnel reflectivity) of the coupled information and intermediate layers sandwich. Thus, the dependence of the reading beam intensity $I_r$ on the number of layers that had been passed by the incident beam may be represented as follows:

$$I_r(n) = I_0 P^n \quad (6)$$

wherein n=1,2, ..., M and $I_0$ is the initial intensity of the incident laser beam. The optimal value of the optical density αdF of stored information should be small enough to allow the light to reach the lowermost information layer. Therefore, the following assumption should be made:

$(1-P) \ll 1$, i.e. $\alpha dF \ll 1$ and $R \ll 1$

In accordance with the equations (1)–(3) above, the intensity of "signal fluorescence" generated by the in-focus data regions collected by the objective lens and delivered to the detector unit will be:

$$I_s = \eta_{coup} q I_0 \alpha d F_0 P^{m-1} \quad (7)$$

wherein $F_0 = (NA \cdot r_0/0.61\lambda)^2 \approx (r_0/\lambda)^2$ is the in-focus-layer "filling rate" (i.e. the surface area covered by the fluorescent regions with respect to the diffraction-limited laser spot). It can be easily shown that the average intensity of fluorescence generated by the fluorescent regions located in the out-of-focus layers is approximately equal to $I_s F/F_0$.

To simplify further considerations, we shall assume that $F \approx F_0$, which is typically the case in practice. At any n-th out-of-focus layer the illuminated spot has the size equal to $2L(n-m) \cdot (NA)_r$ and simultaneously covers about N=[2

$(n-m)L \cdot (NA)_r/\delta]^2$ data regions, where $\delta \sim 2\lambda$, is the average distance between the adjacent data regions. If $L \gg \lambda$, we have $N \gg 1$ and the distribution of the locations of fluorescent regions and non-fluorescent (i.e. surrounding) regions over the surface of one information layer may be considered as Gaussian one with deviation $\sim N^{1/2}$. Then, the average intensity of background noise (i.e. fluorescence propagating towards the detector unit from all out-of-focus information layers) will be found as follows:

$$I_N = I_0(1-P^{2M})/(1+P) \approx MI_S \qquad (8)$$

and the fluctuations of noise intensity will be found as follows:

$$\delta I_N = I_s \sigma \delta/(2L \cdot NA) \approx I_s \sigma(\lambda/L) \qquad (9)$$

wherein $$\sigma^2 = \sum_{k=1}^{m-1} \frac{P^{2n-2m-2k}}{k^2} + \sum_{k=1}^{M-m} \frac{P^{2n-2m+2k}}{k^2} \qquad (10)$$

Here $\sigma$ is the normalized dispersion of noise intensity distribution. $\sigma$ is a very slowly varying parameter, which can be estimated as follows:

$$\sigma \approx 1 \pm 0.5 \text{ for } F<0.2, 1<M<100, 0<\alpha d<0.2 \text{ and } 0<R<0.1 \qquad (11)$$

Hence, the condition of $L \gg \lambda$ is required for small noise intensity fluctuations. Although at $M \gg \lambda$ the average noise power is too large ($N \gg I_s$), in the case $L \gg \lambda$ we have $I_s \gg \delta I_N$, and it is possible to extract the data signal from the noise.

Thus, in contrast to the approach disclosed in the above U.S. Pat. No. 5,268,862, the above examples of medium excitation enable only one focused laser beam to be utilized for exciting simultaneously huge amount of fluorescent regions in a whole volume confined within the solid angle (cone) of light propagation inside the disk. Therefore the reading of the single bit of information from the isolated data region is provided at the detection stage.

The amplitude of the information signal varies between its minimum and maximum values as a sequence of data regions and surrounding regions. As described above with reference to FIG. 7, the passage of the incident beam through the objective lens 18 results in the illuminated spot 20 in the addressed layer $L_3$ always being smaller than those ($S_1$ and $S_2$) of the non-addressed layers ($L_1$ and $L_2$). The spot of the non-addressed layer covers much more data regions than that of the addressed layer. Hence, the depth of modulation (i.e. the extent of amplitude variation) of the output fluorescent radiation produced in any out-of-focus layer is significantly different from that of the in-focus layer. This allows for reliable separating of the output radiation produced in the addressed layer from the output radiation coming from the carrier, by filtering out the low-frequency component of the detected fluorescent signal, resulting in sufficiently high signal-to-noise ratio. The low-frequency component includes inter alia fluorescent intensity modulation caused by distortions of the incident beam (resulting from its passage through the above-focus layers), and intensity modulation associated with the out-of-focus layer.

Indeed, the characteristic modulation frequency is different for different layers and is determined by the distance L between the layers. While at the addressed layer the micron-sized shift of the disk position will result in 100% amplitude modulation, at the adjacent layer the same shift will make negligible change in the fluorescence output. It happens because at the addressed layer the diffraction-limited laser spot illuminates the only single fluorescent region, while at the adjacent (out-of-focus) layer the laser spot size is about $2L \cdot (NA)_r$ and it simultaneously covers about $N^2$ data regions, wherein:

$$N = 2L \cdot (NA)_r/\delta \approx L/\lambda \gg 1 \qquad (12)$$

For example at $L \sim 30 \mu m$ there will be covered about 3600 data regions. At the micron-sized shift of the laser spot position the only small amount of "new" data regions $N \sim L/\lambda$ will appear inside the laser spot size. In other words, the modulation frequency value of fluorescence coming from the non-addressed layer is N times lower than the same one for the fluorescence coming from the addressed layer. This ratio permits to provide good filtration of the detected signal to read the information only from the single data region.

Supposing the Gaussian distribution of the locations of fluorescent regions and non-fluorescent (surrounding) regions within the surface of the information layer and assuming that the distance between adjacent information layers is: $L \sim 30 \mu m$ ($N \sim 60$), the data regions number deviation and signal modulation depth at the adjacent layer can be estimate as follows:

$$\delta N = \sqrt{\approx 8}; \quad \delta I/I_{s=\sqrt{N/N}}^2 \approx 2 \cdot 10^{-3} \qquad (13)$$

Taking into account the noise value accumulated from all non-addressed layers the detected signal-to-noise ratio can determined:

$$S/N = [\tau I_m/I_S]^{-1} = [1.5 \delta I/I_S]^{-2} \approx 5 \cdot 10^2 \qquad (14)$$

Figure 12:
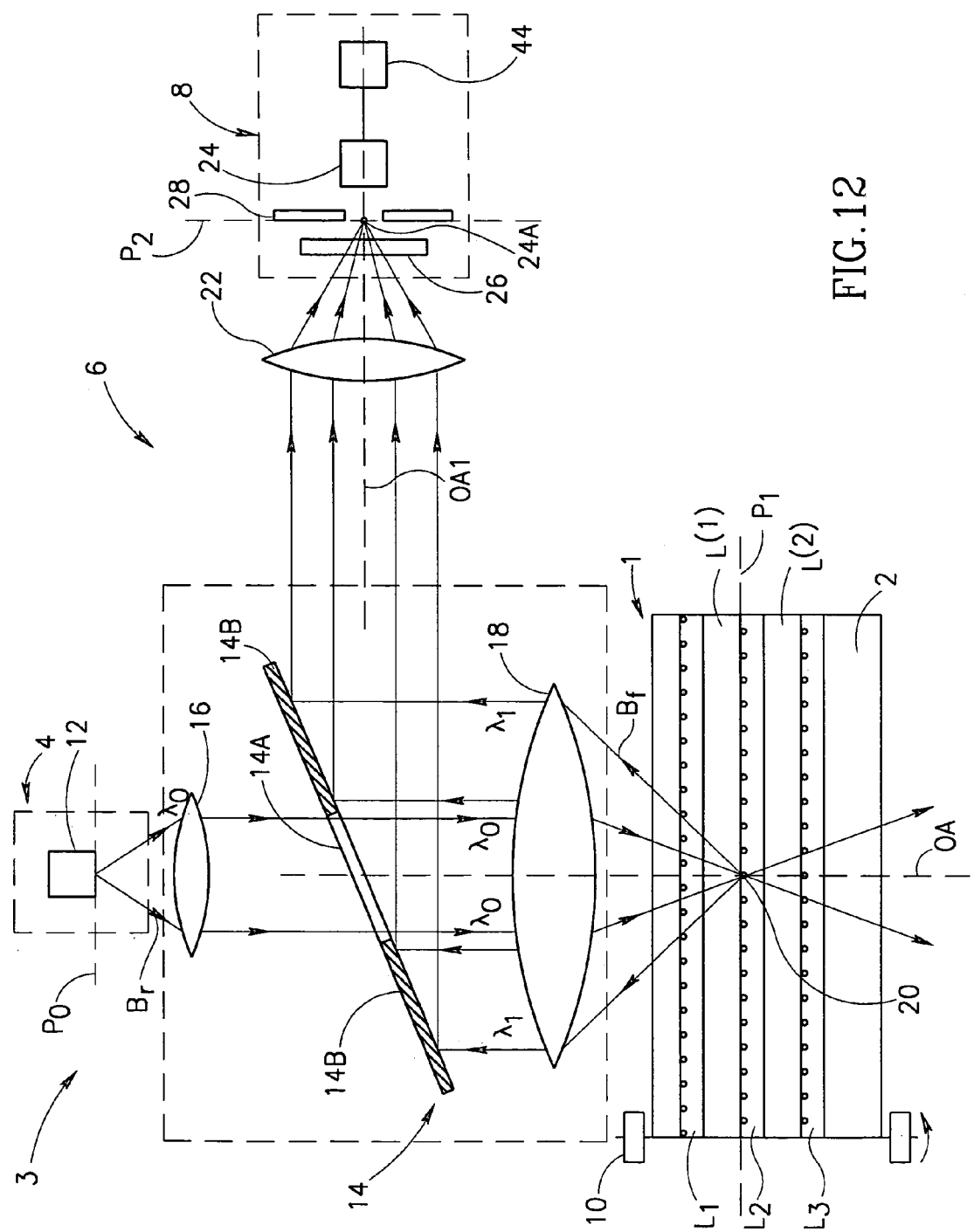
FIG. 12 is block-diagram illustrating the main components of a reading apparatus according to yet another embodiment of the invention.

FIG. 12 illustrates, by way of a block diagram, a reading apparatus 330 associated with the disk 1. Here, in distinction to the previously described embodiments of the invention, an output 24b of the sensor 24 is connected to an electronic band-pass filter 44. The filter 44 receives electrical signals coming from the output circuit 24b and cuts off the low modulation frequency signal, so as to pick up a substantially high modulation frequency signal. The latter (its amplitude) is analyzed with respect to the expected value and with respect to the entire received signal. The construction and operation of such a band-pass filter are known per se and therefore need not be specifically described. Additionally, as illustrated in FIG. 12, the spectral filter 26 may be a constructional part of the sensor 24, rather than being a stand-alone unit.

Those skilled in the art will readily appreciate that many modifications and changes may be applied to the invention as hereinbefore exemplified without departing from its scope defined in and by the appended claims. For example, the lenses 16 and 22 and beam splitter 214 (in FIG. 9) could be replaced by an appropriately designed holographic plate. If the provision of the polarizer 42 is desired, it may be a part of this holographic plate. The excited output radiation may be any scattered radiation other than fluorescence. The technique used in the above-described embodiments of a reading apparatus may be applied for a focus error detection.

What is claimed is:

1. A scanning apparatus for reading information in a three-dimensional information carrier formed with a plurality of spaced-apart data regions, each surrounded by surrounding regions, wherein the data regions are made of a material capable of generating an output excited radiation, when interacting with a predetermined incident exciting radiation, and the surrounding regions are substantially optically transparent, the apparatus comprising:

a) an illumination unit producing a scanning beam of the incident radiation;

b) a light directing unit for projecting said scanning beam on a scan region located in an addressed plane inside the carrier and collecting the produced output radiation, the light directing unit being capable of picking up a predetermined portion of the collected output radiation so as to provide spatial separation of the output radiation components produced by the data regions located in the addressed plane and the output radiation components produced by the data regions located at any other location inside the carrier;

c) a detector unit having a receiving surface, and being capable of detecting the output radiation and generating data representative thereof;

wherein said predetermined portion of the output radiation propagates within a solid angle substantially spatially separated from a solid angle of propagation of the incident radiation; and wherein the light directing unit comprises a beam splitter defining transmitting and blocking channels with respect to the incident radiation and output radiation, and transmitting and reflective channels with respect to the output radiation.

2. The apparatus according to claim 1, wherein said beam splitter is a mirror having a central zone transmitting the incident and output radiation, surrounded by a periphery zone blocking the propagation of the incident radiation and reflecting the output radiation.

3. The apparatus according to claim 1, wherein said beam splitter is a mirror accommodated so as to block the propagation of a central portion of the scanning beam and allowing the propagation of a periphery portion of the scanning beam, the mirror having a surface reflective with respect to the output radiation.

4. A scanning apparatus for reading information in a three-dimensional information carrier formed with a plurality of spaced-apart data regions, each surrounded by surrounding regions, wherein the data regions are made of a material capable of generating an output excited radiation, when interacting with a predetermined incident exciting radiation, and the surrounding regions are substantially optically transparent, the apparatus comprising:

a) an illumination unit producing a scanning beam of the incident radiation;

b) a light directing unit for projecting said scanning beam on a scan region located in an addressed plane inside the carrier and collecting the produced output radiation, the light directing unit being capable of picking up a predetermined portion of the collected output radiation so as to provide spatial separation of the output radiation components produced by the data regions located in the addressed plane and the output radiation components produced by the data regions located at any other location inside the carrier;

c) a detector unit having a receiving surface, and being capable of detecting the output radiation and generating data representative thereof;

wherein said detector unit comprises a sensing means and a filtering means;

wherein said filtering means comprises an optical filter; and wherein said optical filter is a spatial filter.

5. The apparatus according to claim 4, wherein said spatial filter defines said receiving surface and is located in front of the sensing means, the spatial filter having an aperture hole of a diameter substantially equal to the diameter of an image of one data region included in the scan region, as obtained at the receiving surface.

6. A scanning apparatus for reading information in a three-dimensional information carrier formed with a plurality of spaced-apart data regions, each surrounded by surrounding regions, wherein the data regions are made of a material capable of generating an output excited radiation, when interacting with a predetermined incident exciting radiation, and the surrounding regions are substantially optically transparent, the apparatus comprising:

a) an illumination unit producing a scanning beam of the incident radiation;

b) a light directing unit for projecting said scanning beam on a scan region located in an addressed plane inside the carrier and collecting the produced output radiation, the light directing unit being capable of picking up a predetermined portion of the collected output radiation so as to provide spatial separation of the output radiation components produced by the data regions located in the addressed plane and the output radiation components produced by the data regions located at any other location inside the carrier;

c) a detector unit having a receiving surface, and being capable of detecting the output radiation and generating data representative thereof;

wherein said detector unit comprises a sensing means and a filtering means; and wherein said filtering means comprises a band-pass filter.

* * * * *